US009091230B2

(12) United States Patent
Dittmann et al.

(10) Patent No.: US 9,091,230 B2
(45) Date of Patent: Jul. 28, 2015

(54) LINKED RING PETAL ACTUATION FOR VARIABLE AREA FAN NOZZLE

(75) Inventors: Rainer Dittmann, Everett, WA (US); Reid A. McCracken, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 647 days.

(21) Appl. No.: 13/473,367

(22) Filed: May 16, 2012

(65) Prior Publication Data
US 2013/0306755 A1 Nov. 21, 2013

(51) Int. Cl.
F02K 1/12 (2006.01)
F01D 17/14 (2006.01)
F02K 1/00 (2006.01)
F02K 1/15 (2006.01)

(52) U.S. Cl.
CPC ............ *F02K 1/1207* (2013.01); *F01D 17/141* (2013.01); *F02K 1/004* (2013.01); *F02K 1/1223* (2013.01); *F02K 1/15* (2013.01); *F05D 2250/42* (2013.01); *F05D 2260/50* (2013.01); *F05D 2260/56* (2013.01); *F05D 2270/60* (2013.01); *F05D 2270/62* (2013.01); *Y02T 50/672* (2013.01)

(58) Field of Classification Search
CPC ........... F02K 3/06; F02K 3/075; F02K 3/025; F02K 1/72; F02K 1/70; F02K 1/566; F02K 1/763; F02K 1/1207; F02K 1/12; F02K 1/06; F02K 1/62
USPC .................. 60/770, 771, 226.1, 226.2, 226.3; 239/265.11–265.43
See application file for complete search history.

(56) References Cited

U.S. PATENT DOCUMENTS

| 2,811,831 | A | | 11/1957 | Geary et al. |
| 2,901,910 | A | | 9/1959 | Wandell et al. |
| 5,485,958 | A | * | 1/1996 | Nightingale ............. 239/265.19 |

(Continued)

FOREIGN PATENT DOCUMENTS

| EP | 0833047 A2 | 4/1998 |
| EP | 1873386 A2 | 1/2008 |

(Continued)

OTHER PUBLICATIONS

Extended European Search Report, European Application No. 13165693.6 (European counterpart of the instant application), dated Feb. 20, 2015.

*Primary Examiner* — Phutthiwat Wongwian
*Assistant Examiner* — Steven Sutherland
(74) *Attorney, Agent, or Firm* — Ostrager Chong Flaherty & Broitman P.C.

(57) ABSTRACT

A variable area fan nozzles comprising an array of rigid petals hinged to a lip area at the downstream end of a thrust reverser sleeve (or half-sleeve). In one embodiment, the actuation system comprises a rotatable ring segment, a drive system for rotating the ring segment, a plurality of cams attached or integrally formed with the ring segment, a plurality of cam followers, and a plurality of petal linkages which operatively couple the petals to the cam followers. This actuation system controls the deflection of the petals, thereby controlling the amount of opening and the rate at which the fan nozzle throat area changes. Each cam may have forward- and rearward-facing camming surfaces that interact with the cam followers to force the petals to pivot outward or inward respectively.

20 Claims, 14 Drawing Sheets

(56) References Cited

U.S. PATENT DOCUMENTS

| | | | |
|---|---|---|---|
| 5,794,850 A * | 8/1998 | Gutierrez, Jr. | 239/127.1 |
| 6,240,720 B1 * | 6/2001 | Tseng et al. | 60/770 |
| 6,378,294 B1 * | 4/2002 | Abbe et al. | 60/232 |
| 7,637,095 B2 | 12/2009 | Winter et al. | |
| 7,721,549 B2 | 5/2010 | Baran | |
| 7,721,551 B2 | 5/2010 | Hanson | |
| 8,316,646 B2 * | 11/2012 | Baran | 60/771 |

| | | | |
|---|---|---|---|
| 2005/0151012 A1 | 7/2005 | Lair | |
| 2010/0050596 A1 | 3/2010 | Winter et al. | |
| 2010/0139285 A1 | 6/2010 | Winter et al. | |

FOREIGN PATENT DOCUMENTS

| | | |
|---|---|---|
| EP | 1956224 A2 | 8/2008 |
| FR | 1228468 A | 8/1960 |

\* cited by examiner

LINKED RING PETAL ACTUATION FOR VARIABLE AREA FAN NOZZLE

BACKGROUND

This disclosure relates generally to turbofan engines and, more particularly, to turbofan engines having a variable area fan nozzle. In particular, this disclosure relates to variable area fan nozzles that comprise a plurality of circumferentially arranged petals for varying the exit or throat area of the nozzle.

Aircraft noise pollution is a significant environmental problem for communities near airports. Jet engine exhaust accounts for a majority of the noise produced by engine-powered aircraft during takeoff. Because it occurs at a relatively low frequency, jet engine exhaust noise is not effectively damped by the atmosphere alone.

Bypass turbofan engines typically produce two exhaust stream components: the engine core flow and the fan flow. The engine core flow is discharged from a core flow nozzle after passing through a core engine. The fan flow passes through an annular passageway formed by a core engine nacelle which surrounds the core engine and a fan duct which surrounds at least a portion of the core engine nacelle. An outlet for the fan duct is defined intermediate the core nacelle and a variable area fan nozzle. In some implementations, the variable area fan nozzle is secured to the downstream end of an axially translatable thrust reverser sleeve, which forms a part of the fan duct. The fan flow exits this outlet. The engine and fan flows collectively produce thrust that propels the aircraft forward.

In bypass turbofan engines, the engine core flow throat area at the core flow nozzle and the fan flow throat area at the fan nozzle are preferably optimized for specific engine operating conditions. For example, during takeoff, a relatively high level of thrust is required from the engines as compared to lower levels of thrust that are required during cruise flight. Increasing the quantity or mass of airflow through the fan duct having a fixed throat area at the fan nozzle results in an increase in the velocity of the airflow. An increase in the nozzle exit velocity results in an increase in the amount of noise that is generated by the nozzle.

One approach to increasing the fan nozzle throat area as a means to reduce noise generated during high-thrust events such as during takeoff is through the use of movable flaps or petals which form the fan nozzle exit external boundary. The flaps or petals may be deflected outwardly to enlarge the throat area of the fan nozzle and thereby reduce the exhaust velocity or, conversely, they may be deflected inwardly to reduce the throat area of the fan nozzle and thereby increase the exhaust velocity.

It is known to vary the area of the fan nozzle (thereby modulating the fan flow) by deflecting flaps or panels (hereinafter "petals") attached to the trailing lip area of an axially translatable thrust reverser sleeve. As used herein (including in the claims), the term "sleeve" includes at least the following configurations: (1) a one-piece axially translatable sleeve that extends around a major portion of the circumference of the fan duct, from one side of the engine pylon to the other; and (2) two axially translatable half-cowls mounted on rails fixed to upper and lower beams and extending from the upper beam to the lower beam. In accordance with the latter configuration, the upper beam is the main hinge beam that allows the reverser to open for engine access and removal. The lower beam (referred to hereinafter as "latch beam") provides a means for locking together the two half-cowls. Thus the second configuration typically has two upper hinge beams and two latch beams.

There is a continuing need for improvements in the means for actuating a variable area fan nozzle.

SUMMARY

The variable area fan nozzles disclosed hereinafter allow the fan flow in a turbofan engine to be modulated by varying the exit or throat area at the trailing edge of a fan duct or thrust reverser sleeve. In accordance with embodiments disclosed hereinafter, such variable area fan nozzles comprise an array of rigid petals hinged to a lip area at the downstream end of a thrust reverser sleeve (or half-sleeve). The actuation system in accordance with one embodiment comprises a rotatable ring segment (one ring segment per nacelle side), a drive system for rotating the ring segment, a plurality of cams attached or integrally formed with the ring segment, a plurality of cam followers, and a plurality of petal linkages which operatively couple the petals to the cam followers. This actuation system controls the deflection of the petals, thereby controlling the amount of opening and the rate at which the fan nozzle throat area changes. In accordance with a further aspect, the cam may have forward- and rearward-facing camming surfaces that interact with the cam followers to force the petals to pivot outward or inward respectively.

In accordance with particular embodiments, the variable area fan nozzle comprises left and right fan nozzle assemblies, each assembly comprising: a support member (e.g., a bulkhead) having a circular arc shape centered at an axis; a ring segment having a circular arc shape, the ring segment being supported by and movable along the support member, movement along the support member being a rotation about the axis; and a drive system capable of moving the ring segment along the support member. Each fan nozzle assembly further comprises: a plurality of cams attached to or integrally formed with the ring segment, the cams being located at respective angular positions along the ring segment; a plurality of cam followers that are displaced along respective straight lines by the cams during rotational movement of the ring segment along the support member; a plurality of push rods, each push rod having one end coupled to a respective one of the cam followers; a plurality of petal links, each petal link having one end pivotably coupled to an opposite end of a respective one of the push rods; and a plurality of petals pivotably coupled to the support member, each petal being pivotably coupled to an opposite end of a respective one of the petal links. The distal ends of the petals of the left and right fan nozzle assemblies define an exit or throat area of the variable area fan nozzle.

In accordance with the aforementioned particular embodiments, when the ring segments rotate in first and second directions respectively, the throat area decreases, and when the ring segments rotate in third and fourth directions respectively (the third and fourth directions being respectively opposite to the first and second directions), the throat area increases. The fan nozzle throat area may be adjusted to under-area (compared to nominal area at cruise), which benefits fuel consumption during certain segments of flight mission, or to over-area, contributing to noise reduction and improving fan operability.

In accordance with alternative embodiments, the variable area fan nozzle may comprise a circular support member that supports a rotatable unison ring. It should be appreciated that whether the variable area fan nozzle comprises a unison ring or two ring segments, any one of the apparatus disclosed herein for converting rotation into petal deflection can be used in conjunction with either a unison ring or two ring segments. For example, regardless of whether the actuator comprises a unison ring or ring segments, each petal can be operatively coupled to a respective cam by means of an assembly comprising: a cam follower that is displaced along a straight line by the cam during rotational movement of the ring or ring segment; a push rod having one end pivotably coupled to the cam follower; a petal link having one end pivotably coupled to an opposite end of the push rod and having another end pivotably coupled to the petal. In response to camming in one direction or the other, the push rod moves rearward or forward and the petal pivots inward or outward respectively.

In accordance with a further aspect, the system for actuating the variable area fan nozzle comprises: (a) a cam attached to or integrally formed with said ring segment and comprising a forward-facing camming surface and a rearward-facing camming surface; (b) a cam follower that is displaced rearward along a straight line by said rearward-facing camming surface during rotational movement of said ring segment about said axis in a first direction and is displaced forward along said straight line by said forward-facing camming surface during rotational movement of said ring segment about said axis in a second direction opposite to said first direction; and (c) a petal linkage assembly that operatively couples said cam follower to said petal. The petal deflects inward or outward depending on which direction the cam follower is displaced (i.e., rearward or forward).

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Various embodiments will now be described as applied to the thrust reverser sleeve of a turbofan aircraft engine. However, the variable area fan nozzle systems disclosed also have application to the trailing lip area of fan ducts which do not incorporate a thrust reverser sleeve.

Figure 1:
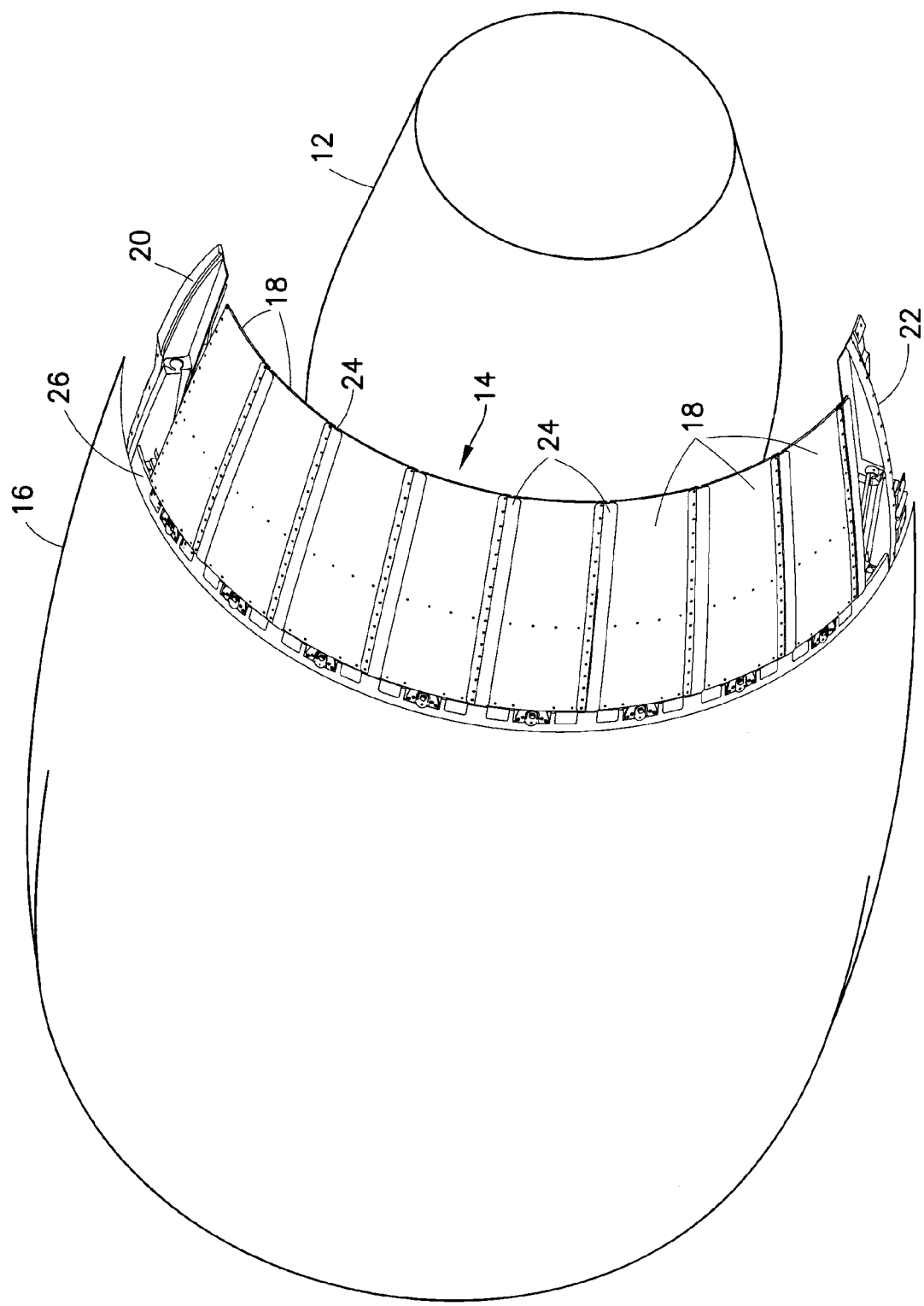
FIG. 1 is a diagram showing an isometric view of portions of an aircraft turbofan engine having a variable area fan nozzle comprising left and right assemblies (only the left assembly is shown).

FIG. 1 shows an isometric view of portions of an aircraft turbofan engine having a variable area fan nozzle comprising left and right assemblies (only the left assembly is shown). A core engine nacelle surrounds the core engine (not shown). The turbofan engine provides thrust from both a core flow of engine exhaust exiting a core flow nozzle 12 that forms a downstream end of the core engine nacelle, and a fan flow exiting from a variable area fan nozzle 14 (only the left assembly is shown) mounted to the downstream end or lip area of a thrust reverser sleeve 16. The sleeve 16 overlaps at least a portion of the core engine nacelle. The core flow generally has a higher velocity than the fan flow.

In accordance with one embodiment, the variable area fan nozzle 14 comprises a multiplicity of pivotable rigid petals 18 which are configured to alter the fan flow passing through the fan duct when the petals are deflected inward or outward. Optionally, the petals 18 may have chevrons (not shown) attached to the distal (i.e., aft) ends thereof. The petals 18 are disposed side by side along a trailing lip of the thrust reverser sleeve 16. On the one hand, if the thrust reverser sleeve is a one-piece axially translatable sleeve, then the petal array extends around a major portion of the circumference of the fan duct, from one side of the engine pylon to the other. On the other hand, if the thrust reverser sleeve comprises two axially translatable half-cowls mounted on rails fixed to an upper (i.e., hinge) beam 20 and a lower (i.e., latch) beam 22, then the petal array consists of two sets of petals attached to the respective half-cowls, each petal set extending from the respective upper beam to the respective lower beam on a respective side of the engine.

In accordance with the embodiment shown in FIG. 1, the forward ends of petals 18 are pivotably coupled by respective hinges to a bulkhead 26 having the shape of a circular arc which is centered at an axis. The ends of the arc-shaped bulkhead 26 are supported by hinge beam 20 and latch beam 22. A control system is configured to control an actuation system (not shown in FIG. 1) which deflects the petals 18 inward from their nominal positions during cruise flight conditions to maximize fuel efficiency. When the actuation system is reversed, the petals return to their nominal positions.

Figure 2:
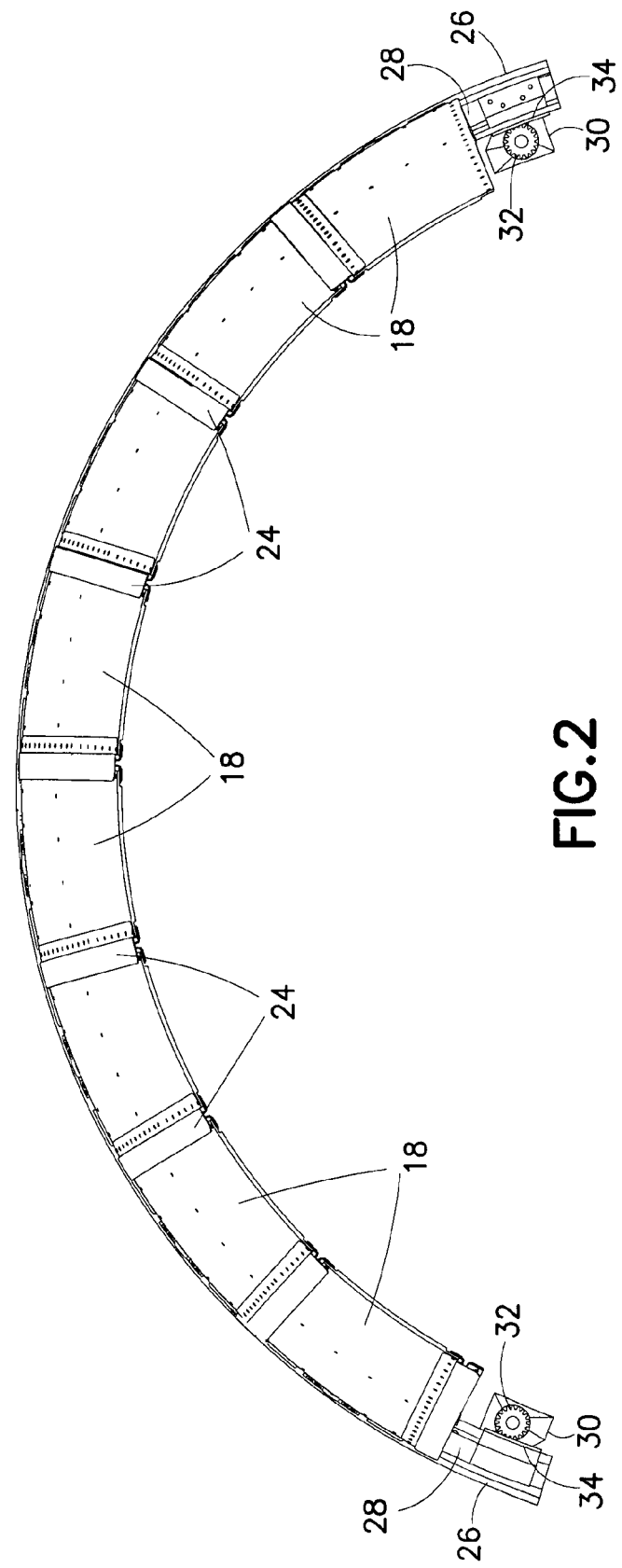
FIG. 2 is a diagram showing an end view (aft looking forward) of a fan nozzle assembly in accordance with one embodiment.

The variable area fan nozzle 14 comprises two sets of hinged petals 18 arranged on opposite sides of an engine pylon. FIG. 2 is an end view (aft looking forward) of one half of a fan nozzle assembly in accordance with one embodiment. Only one set of petals 18 is shown in FIG. 2. For each set of petals, adjacent petals 18 are separated by a triangular or trapezoidal gap or space, each such gap being occupied by a respective elastomeric seal, which is fastened to adjoining petals to ensure zero leakage. In FIG. 2, the elastomeric seals are covered by respective gap covers 24, each gap cover 24 being attached to the left edge of a respective petal 18 and being not attached to the adjacent petal, which allows the gap to alternately narrow and widen as the petal move inward and outward respectively.

In accordance with the teaching herein, the petals of the left- and right-hand assemblies can be deflected inward or outward by means of respective cam ring segments that travel along respective arc-shaped bulkheads. FIG. 2 shows an arc-shaped cam ring segment 28 supported by and movable along a bulkhead 26. To reduce friction, the cam ring segment 28 slides on low-friction pads (not shown in FIG. 2); alternatively, bearings could be used. Movement along the bulkhead 26 is a rotation of the cam ring segment 28 about the axis of the bulkhead. Cam ring segment 28 can rotate in either direction, rotation being driven by a pair of rotary actuators 30. The ring segment has a pair of sector gears 34 attached at opposing ends thereof. Each sector gear 34 can be a straight rack gear or a slightly curved segmented gear. Each rotary actuator 30 drives rotation of a shaft on the end of which a pinion gear 32 is mounted. The teeth of the pinion gear 32 engage teeth of a respective sector gear 34, thereby causing the ring segment 28 to rotate. The rotary actuators 30 may comprise stepper motors, which motors are preferably controlled by a single controller to operate in tandem. As will be explained in more detail below, in cases where the command to the controller is to produce inward petal deflection, the rotation of cam ring segment 28 in one direction will cam the petals 18 inward; in cases where the command to the controller is to produce outward petal deflection, the cam ring segment 28 will rotate in the opposite direction, thereby camming the petals 18 outward.

Figure 3:
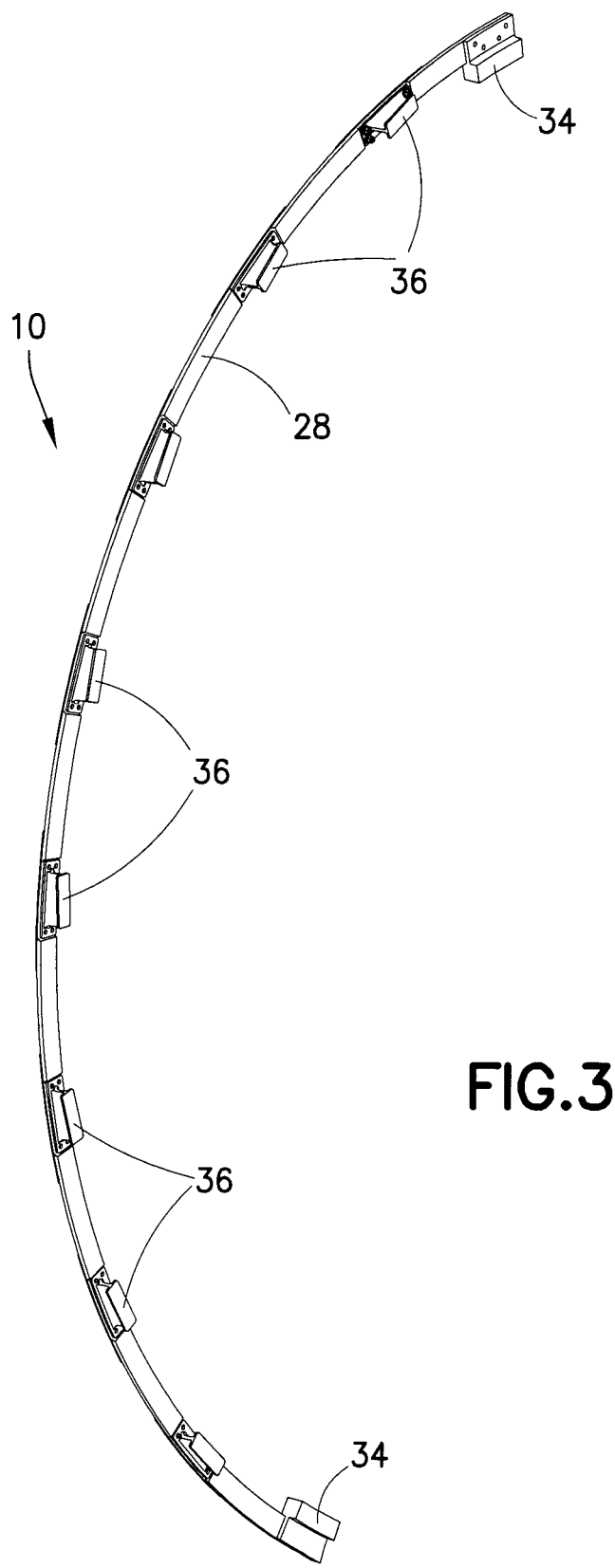
FIG. 3 is a diagram showing an isometric view of a cam ring segment assembly in accordance with the embodiment depicted in FIG. 2.

FIG. 3 is an isometric view of a cam ring segment assembly 10 in accordance with the embodiment depicted in FIG. 2. Assembly 10 comprises a cam ring segment 28 in the shape of a circular arc, a pair of sector gears 34 attached to opposing ends of cam ring segment 28, and a plurality of cams 36 attached to the cam ring segment 28 at respective angular positions spaced along the contour of cam ring segment 28. Alternatively, the cams 36 can be integrally formed with the cam ring segment 28. Each cam 36 is in the form of a flat-bottomed rail having an asymmetrical I-beam profile. The spacing between midpoints of adjacent cams 36 is equal to the spacing between midpoints of adjacent petals (not shown in FIG. 3). As explained below, each petal is operatively coupled to a respective cam so that when the cam ring segment rotates, the petals will be deflected in unison due to the camming action.

Figure 4:
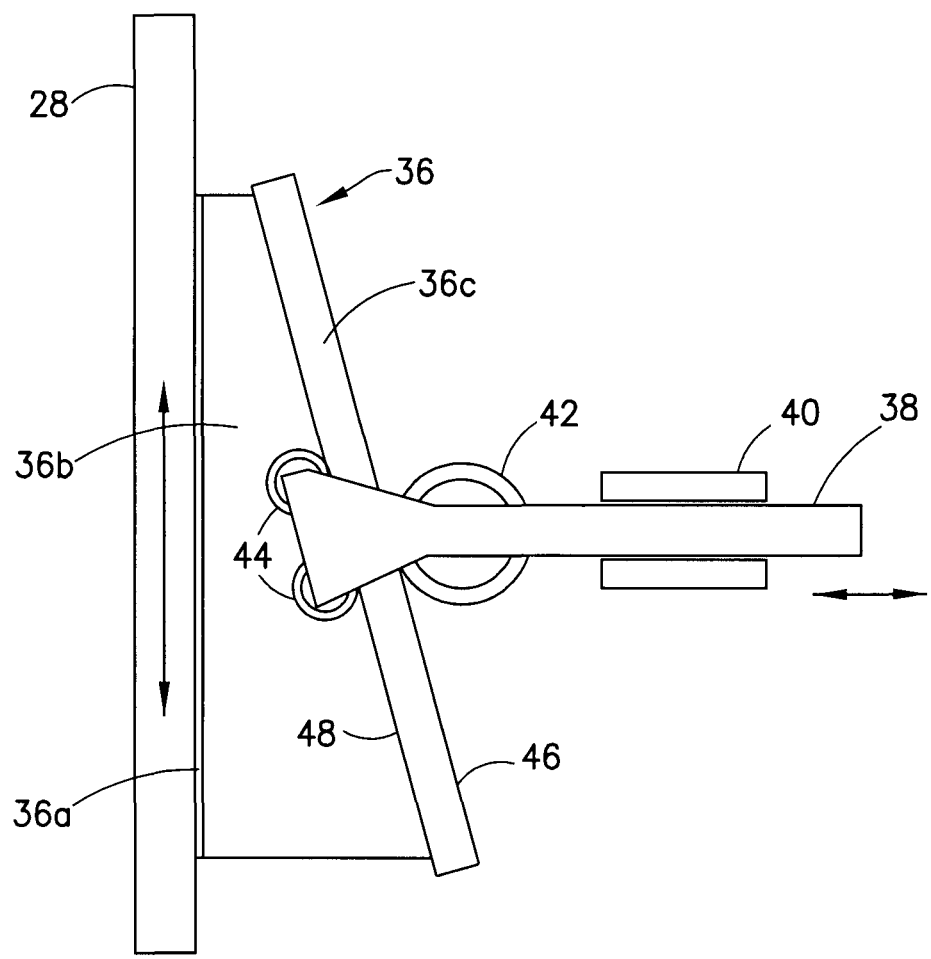
FIG. 4 is a concept diagram showing a side view of a cam configuration in accordance with one embodiment.

FIG. 4 is a concept diagram showing a side view of a cam configuration in accordance with one embodiment. In this configuration, the cam resembles a flat-bottomed rail having an asymmetrical I-beam profile. The foot 36a of the cam 36 is attached to the rotating cam ring segment 28. The cam further comprises a ramped head 36c connected to the foot 36a by a web 36b. The ramped head has a rearward-facing camming surface 46 and two forward-facing camming surfaces 48, only one of which is shown in FIG. 4 (the other being behind the web 36b). A cam follower, comprising a plurality of bearings, is installed in camming relationship with the two-sided cam 36. In the embodiment shown in FIG. 4, the cam follower comprises a large bearing 42 that rolls on the rearward-facing camming surface 46 when the rotating ring segment 28 moves in the upward direction indicated in FIG. 4, and two pairs of small bearings 44 (one pair is hidden behind web 36b) that roll on the respective forward-facing camming surfaces 48 when the rotating ring segment 28 moves in the downward direction indicated in FIG. 4. The bearings of the cam follower are rotatably coupled to a push rod 38 which is movable in a straight line along an axis of a guide 40. In different implementations, the guide can, for example, be a bushing or a bearing. The guide 40 constrains the movement of push rod 38 to be linear. When the cam 36 moves downward as seen in FIG. 4, the push rod will move in a forward direction, i.e., toward the cam ring segment 28. In contrast, when the cam 36 moves upward as seen in FIG. 4, the push rod will move in a rearward direction, i.e., away from the cam ring segment 28. When the push rod 38 moves rearward, the petals deflect inward, thereby decreasing the nozzle throat area. In contrast, when the push rod moves forward, the petals deflect outward, thereby increasing the nozzle throat area.

Figure 5:
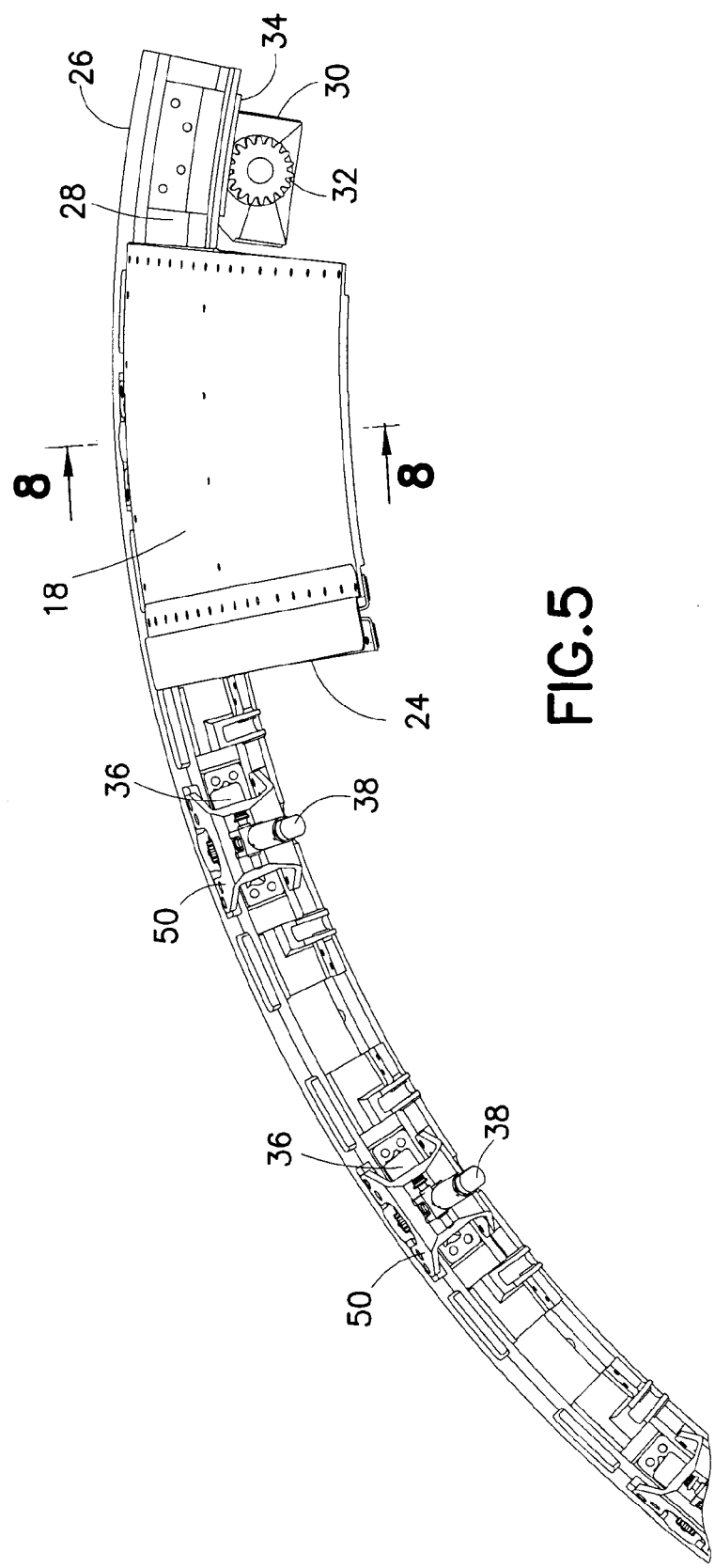
FIG. 5 is a diagram showing an end view (aft looking forward) of a portion of the fan nozzle assembly depicted in FIG. 2, with all but one petal (and associated petal linkages) removed to expose several push rods and push rod fittings attached to the cam ring segment.

FIG. 5 shows a portion of a variable area fan nozzle that implements a variation of the cam configuration depicted in FIG. 4. Each push rod is constrained by a guide incorporated in a push rod fitting 50 that is attached to a bulkhead 26. Only one petal 18 is shown, with other petals removed to expose the push rods 38 and their associated push rod fittings 50.

Figure 6:
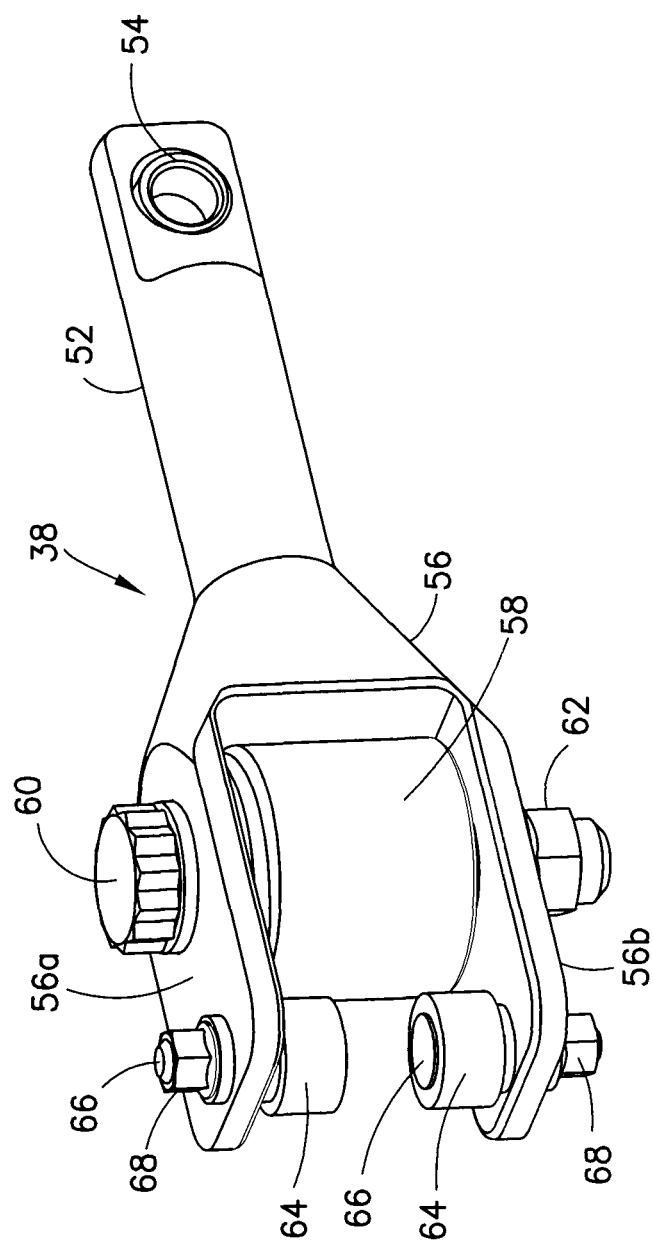
FIG. 6 is a diagram showing an isometric view of a cam follower/push rod assembly in accordance with the embodiment depicted in FIG. 5.

The structure of a push rod in accordance with one embodiment is shown in FIG. 6. The push rod 38 comprises a shaft 52 having one end integrally formed with a yoke 56 having two arms 56a and 56b. The other end of shaft 52 has flattened sides and a guide 54 installed in a hole for receiving a journal that will pivotably couple the push rod to a petal link (not shown). A large needle roller bearing 58 is rotatably mounted on the shaft of a bolt 60 which is attached to yoke arms 56a,b by a nut 62. A pair of small needle roller bearings 64 are rotatably mounted on the shafts of respective bolts 66, which are respectively attached to yoke arms 56a,b by respective nuts 68. Preferably, the shafts of bolts 66 have a common axis. The needle bearings 58 and 64 form a cam follower. The outer races of needle roller bearings 64 are separated from the outer race of needle roller bearing 58 by a gap which is greater than the thickness of the web of the cam to which the cam follower will be coupled.

Figure 7:
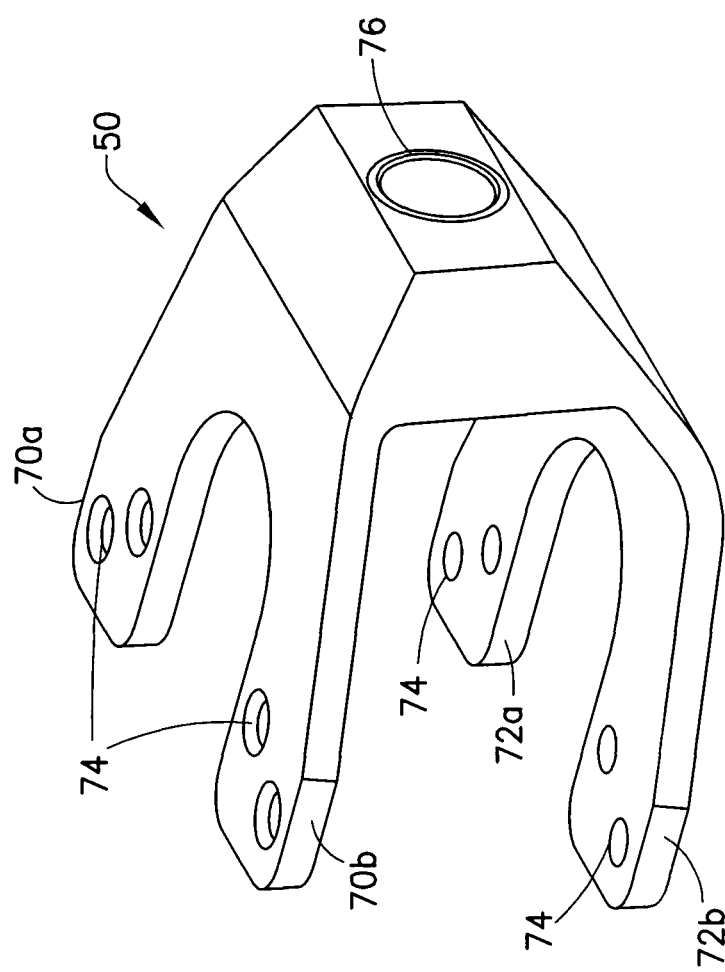
FIG. 7 is a diagram showing an isometric view of a push rod fitting in accordance with the embodiment depicted in FIG. 5.

The push rod shown in FIG. 6 is slidably coupled to the push rod fitting 50 shown in FIG. 7. The push rod fitting 50 is in the form of a yoke having upper arms 70a,b attached to an outer peripheral portion of the bulkhead (item 26 in FIG. 5) and lower arms 72a,b attached to an inner peripheral portion of the bulkhead. The push rod fitting is attached by means of fasteners (not shown) which pass through holes 74 in yoke arms 70a,b and 72a,b. The base of the push rod fitting 50 has a guide 76 installed in a bore. The guide 76 receives the shaft 52 of push rod 38 (see FIG. 6). The push rod is moved rearward along the axis of guide 76 when the rotating ring segment is rotated in one direction; the push rod is moved for a long the axis of guide 76 when the rotating ring segment is rotated in the opposite direction. The rotational motion of the cam ring segment is converted into linear movement of the push rod by the interaction of the cam and cam follower.

Figure 8:
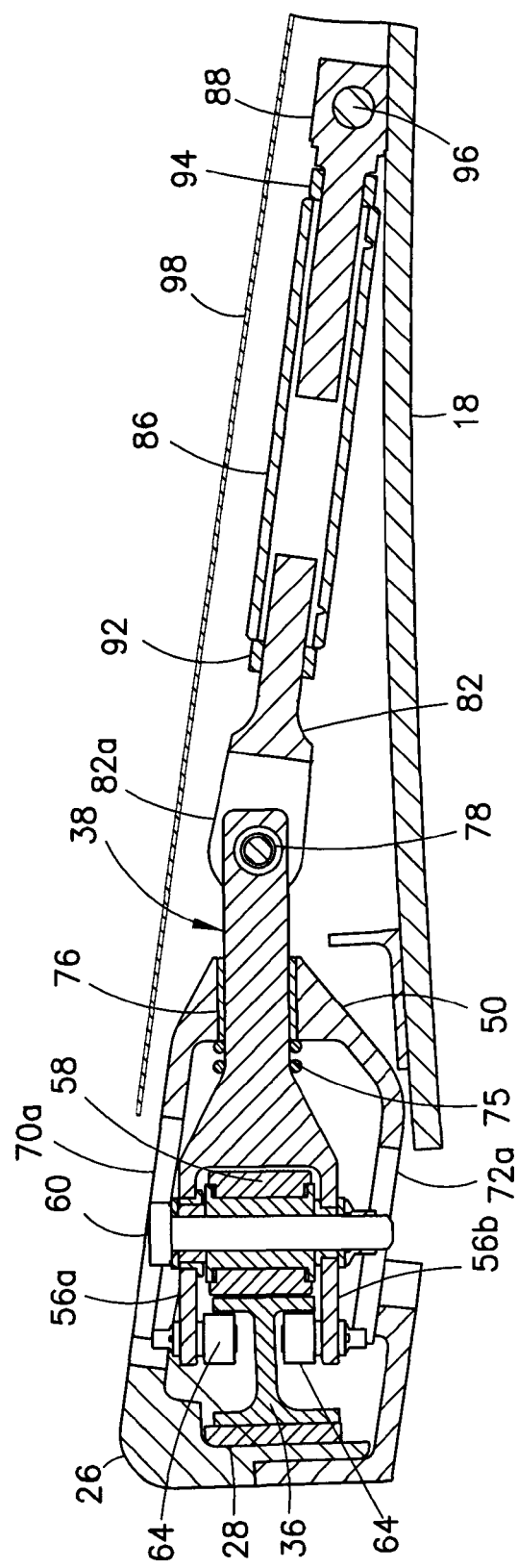
FIG. 8 is a diagram showing a sectional view, the section being taken along line 8-8 indicated in FIG. 5.
Figure 9:
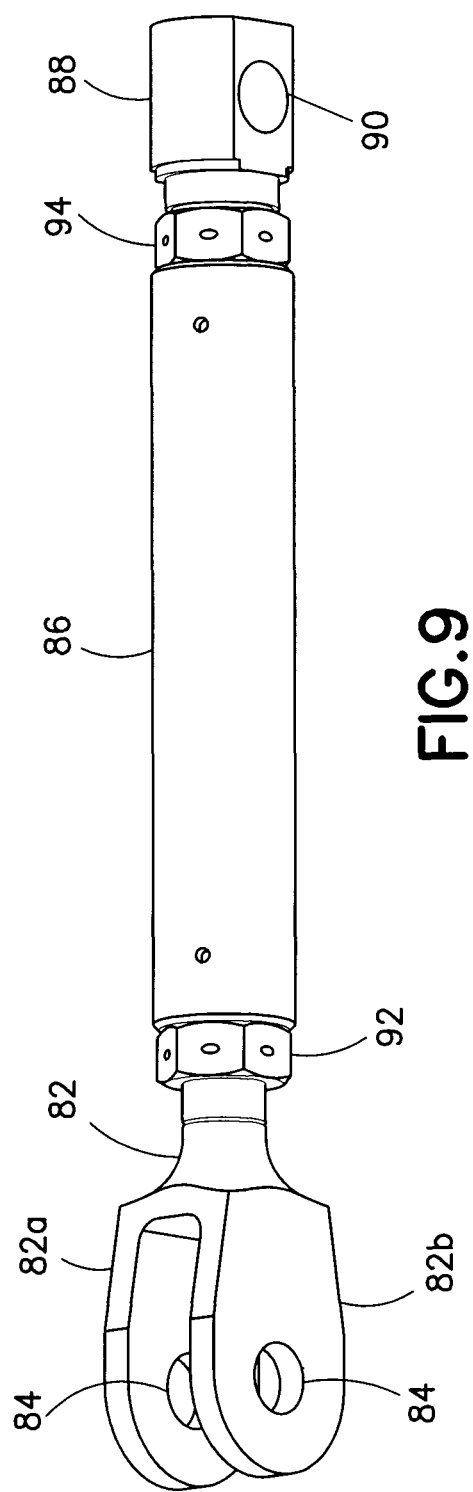
FIG. 9 is a diagram showing an isometric view of a petal link assembly (also referred to herein as a "petal link") suitable for use with the cam follower/push rod assembly depicted in FIG. 8.

FIG. 8 is a sectional view taken along line 8-8 indicated in FIG. 5. In FIG. 8, the cam follower/push rod assembly (including push rod 38) is the same as that seen in FIG. 6. FIG. 8 also shows portions of a push rod fitting 50, which has the structure shown in FIG. 7. To avoid clutter in FIG. 8, the yoke arms 70a and 72a (which would normally be visible behind the section plane) of push rod fitting 50 have not been shown. FIG. 8 also shows portions of a petal link assembly 80, the entirety of which is not shown in FIG. 8, but can be seen in FIGS. 9 and 10. As seen in FIG. 9, the forward end 82 of petal link assembly 80 comprises a yoke having two yoke arms 82a,b. Yoke arms 82a,b are pivotably coupled to the flattened end (inserted between yoke arms 82a,b) of shaft 52 of the push rod 38 (see FIG. 6) by a journal 78 (see FIG. 10). In one specific implementation, the axis of the petal link assembly is oriented at an angle of 8 degrees relative to the axis of the push rod shaft.

Figure 10:
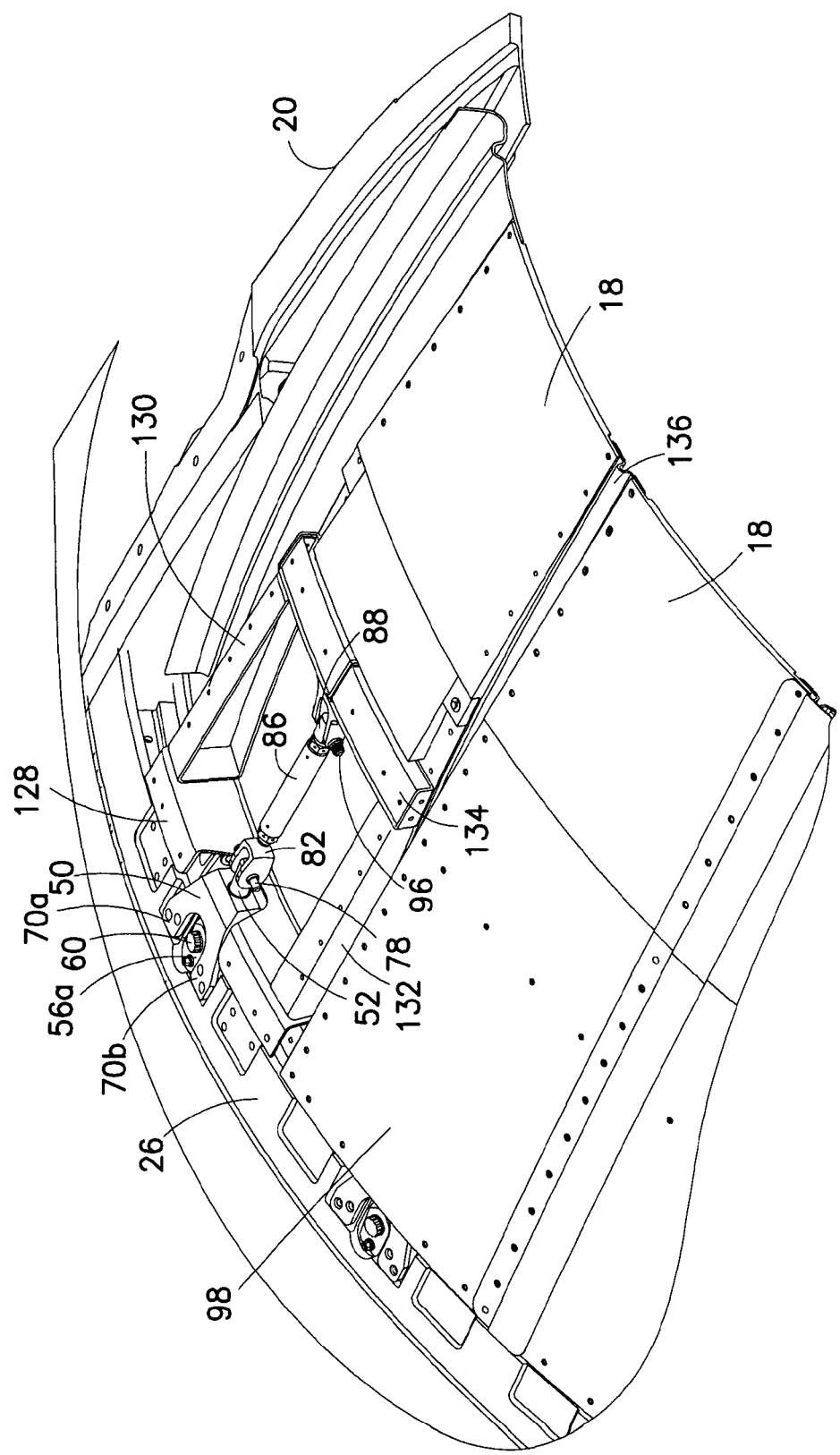
FIG. 10 is a diagram showing an isometric view of the petal seen in FIG. 5, with the petal cover removed to reveal components of the ring-petal linkage.

Referring to FIGS. 8 and 10, the other end 88 of petal link assembly 80 is pivotably coupled to petal 18 by a journal 96. The cover 98 is removable from petal 18 (a cover has been removed in FIG. 10) for installation of petal link assembly 80. Upon installation the petals will be rigged/adjusted to their nominal positions (this will account for installation tolerances). The length of the petal link assembly 80 is adjustable to facilitate petal rigging. In one implementation shown in FIG. 8, the end couplings 82 and 88 of the petal link assembly 80 have threaded shafts which screw into a threaded hollow body 86. (The threads are not shown in FIG. 8.) To adjust the length of the assembly, the end couplings are screwed into the opposing ends of the hollow body 86 and then the hollow body is locked in position using nuts 92 and 94 (see FIG. 9), which are threadably coupled to the respective threaded shafts of end couplings 82 and 88.

Optionally, a compression spring 75 may be disposed on the shaft of push rod 38 and between the push rod yoke and the push rod fitting to bias the push rod 38 to displace in a forward direction. This spring arrangement would resist inward petal deflection caused by rotation of a ring segment in one direction, but would assist outward deflection of the petals when the ring segment is rotated in the other direction.

FIG. 10 is an isometric view showing a portion of a variable area fan nozzle in which one petal 18 has a cover 98 and an adjacent petal 18 has its cover removed. The latter petal also has its gap cover removed to reveal an elastomeric seal 136. With the cover removed, it can be seen that each petal 18 has a support frame comprising a petal hinge fitting 128 and a petal mid-span support 134 connected by left and right petal side walls 132 and 130. The petal hinge fitting 128 has a cutout which provides clearance for the push rod fitting 50 during petal movement. The end coupling 88 of the petal link assembly is attached to the petal mid-span support 134. Each elastomeric seal 136 may be made of silicone rubber or other suitable elastomeric material. The elastomeric seals prevent leakage of air from inside to outside of the variable area fan nozzle through the petal array. The shape of the inter-petal gap does not change, but the triangle or trapezoid gets narrower as the petals deflect inward. The elastomeric seal 136 returns from a stretched condition to a nominal condition during inward petal deflection. The elastomeric seals 136, together with the petals 18, provide a continuous flow surface and prevent air leaking from the fan pressure side of the fan nozzle to the ambient pressure side, thereby improving engine performance.

Figure 11:
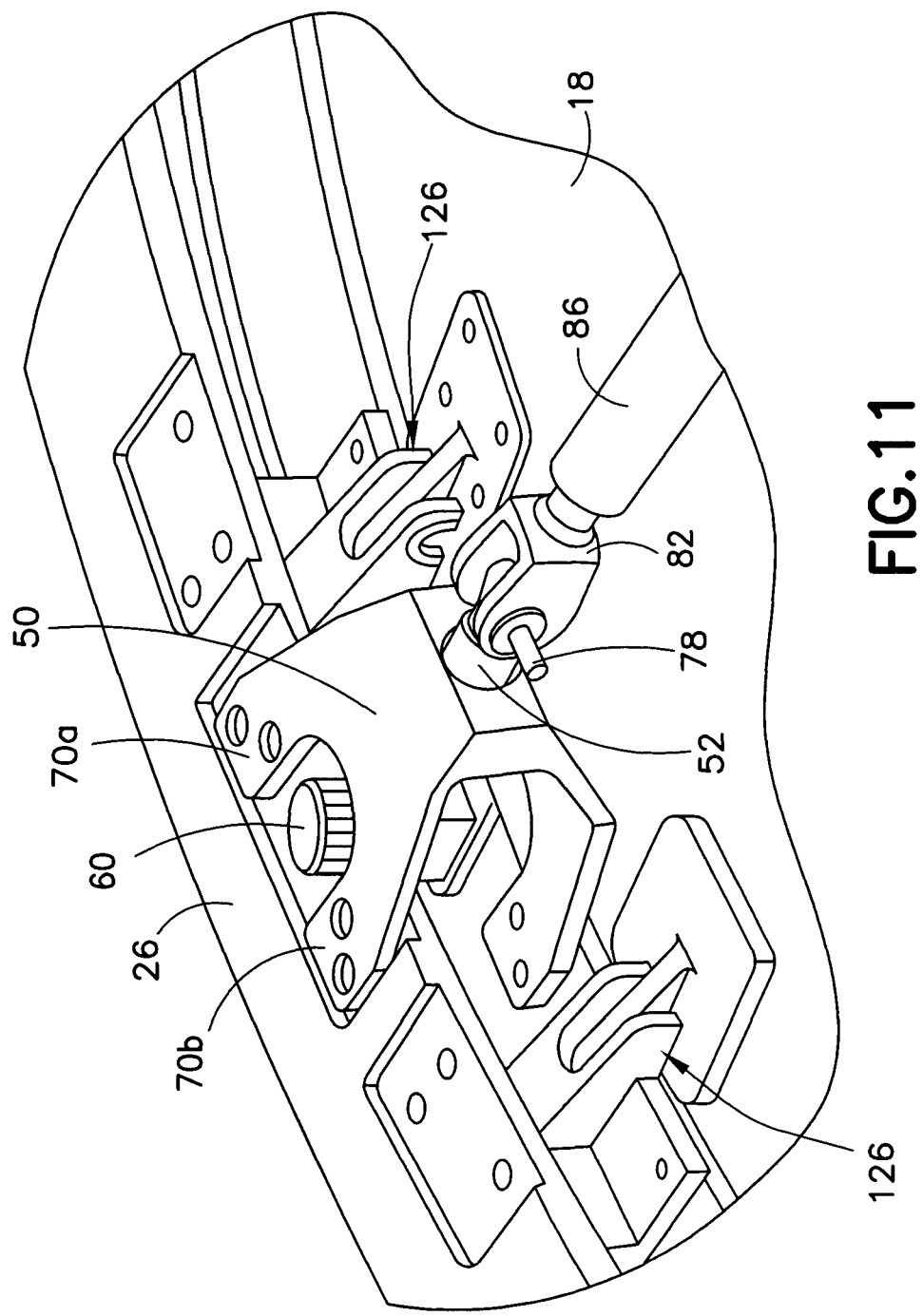
FIG. 11 is a diagram showing the hinged coupling of the petal to the bulkhead in the embodiment depicted in FIG. 10.

FIG. 11 shows a magnified view of the push rod fitting 50 and surrounding area. The petal hinge fitting has been removed to reveal a pair of petal hinges 126 which pivotably couple petal 18 to the bulkhead 26 on opposite sides of the push rod fitting 50. As the cam ring segment rotates, each petal 18 pivots about the axes of hinges 126. The petals can be made of fiber-reinforced plastic, e.g. fiberglass, or other suitable material. For example, the petals may comprise materials such as higher-temperature-resistant aluminum alloys, graphite composites, ceramic-metal composites and higher-temperature-resistant plastics.

Figure 12:
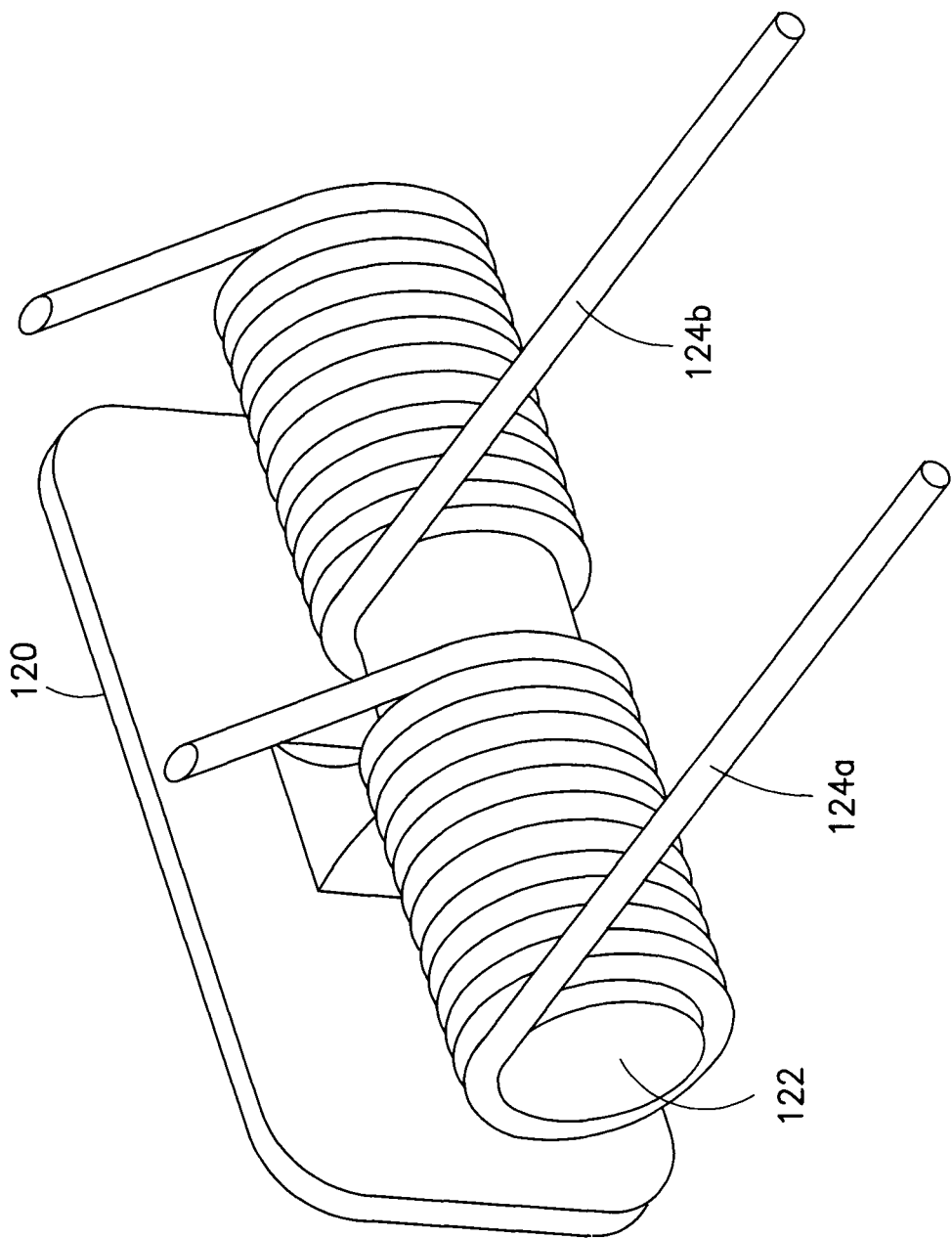
FIG. 12 is a diagram showing an isometric view of a spring assembly for urging a petal to deflect outward in accordance with an alternative embodiment.

In accordance with an alternative embodiment, biasing means may be provided for urging the petals to deflect outward. Such biasing means would resist inward petal deflection caused by rotation of a ring segment in one direction, but would assist outward deflection of the petals when the ring segment is rotated in the other direction. Such biasing means may take many forms. FIG. 12 shows a biasing means in accordance with one embodiment, comprising a flange 120 that will be fastened to the bulkhead (not shown), a dual spring support rod 122 which is mounted to an end of a beam which projects from the rear face of flange 120, and a pair of torsion springs 124a and 124b wound around respective portions of support rod 122. The ends of torsion springs 124a,b which point upward in FIG. 12 would be attached to the bulkhead, while the ends of torsion springs 124a,b which point downward and to the right in FIG. 12 would be attached to the petal (not shown).

Figure 13:
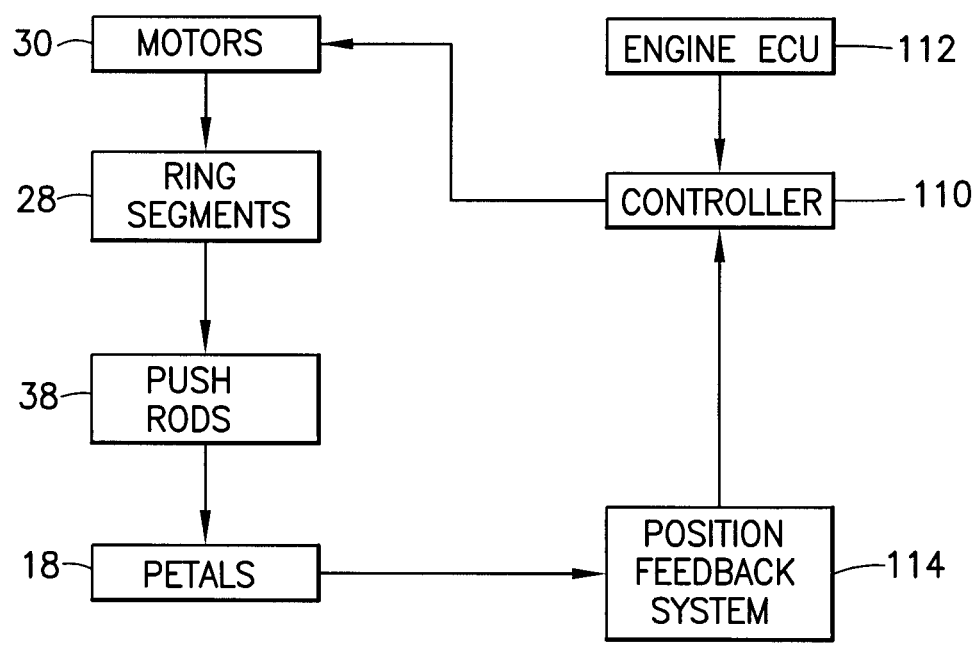
FIG. 13 is a block diagram showing the architecture of a system for controlling variable area fan nozzle petal deflection in accordance with one embodiment.

The rotation of the ring segments and resulting deflection of the petal can be controlled automatically in response to flight conditions. FIG. 13 shows the architecture of a system for controlling variable area fan nozzle petal deflection in accordance with one embodiment. A plurality of motors 30 are controlled by a controller 110. The controller 110 may be implemented as part of the aircraft system, a centralized aircraft processor, a subsystem computing module dedicated to controlling petal deflection, or the like. The shafts of motors 30 carry pinion gears which engage corresponding sector gears attached to the ends of ring segments 28. The camming action converts rotation of the ring segments 28 into linear motion of the push rods 38. The linear motion of the push rods is converted into deflection of the petals 18 by the petal links. Optionally, the deflection of the petals 18 can be measured by a position feedback system 114 (e.g., a fiber optical system) that outputs data representing those measurements. The controller 110 receives inputs from an engine control unit (ECU) 112 and from the position feedback system 114, and then continuously adjusts the degree of petal deflection via the actuation system, thereby adjusting the fan nozzle throat area, based on the petal positional information received.

Figure 14:
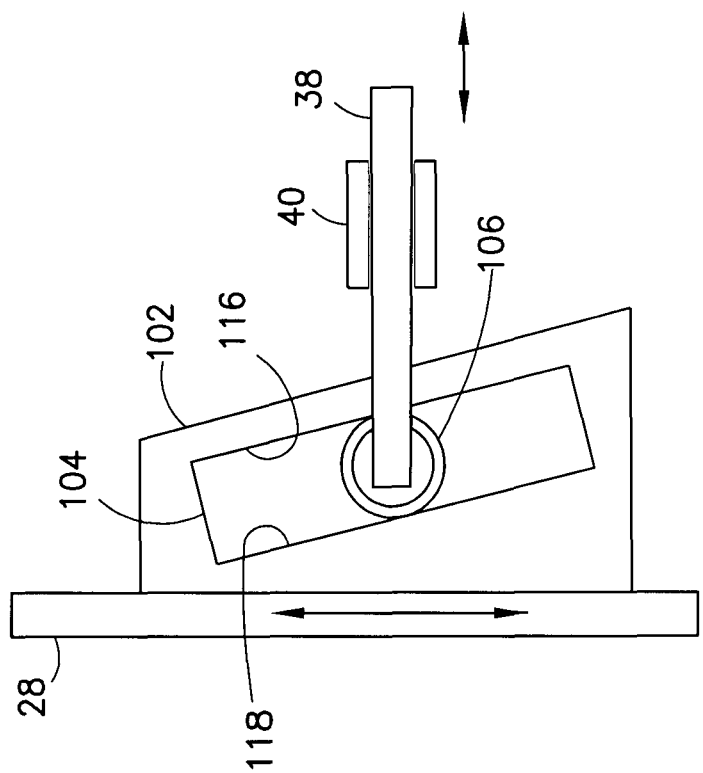
FIGS. 14 and 15 are concept diagrams showing side views of two cam configurations in accordance with alternative embodiments.

FIG. 14 is a concept diagram showing a side view of a cam configuration in accordance with an alternative embodiment. In this configuration, the cam 104 has an inclined slot 104. The slot 104 comprises a forward-facing camming surface 116 and a rearward-facing camming surfaces 118. The cam follower comprises a bearing 106 that rolls on the rearward-facing camming surface 118 when the rotating ring segment 28 moves in the upward direction indicated in FIG. 14, and that rolls on the forward-facing camming surfaces 116 when the rotating ring segment 28 moves in the downward direction indicated in FIG. 14. The diameter of bearing 106 is less than the width of slot 104. The bearing 106 is rotatably coupled to a forward end of the push rod 38, which is movable in a straight line along an axis of guide 40. When the cam 102 moves downward as seen in FIG. 14, the push rod 38 will move in a forward direction, i.e., toward the cam ring segment 28. In contrast, when the cam 102 moves upward as seen in FIG. 14, the push rod 38 will move in a rearward direction, i.e., away from the cam ring segment 28.

Figure 15:
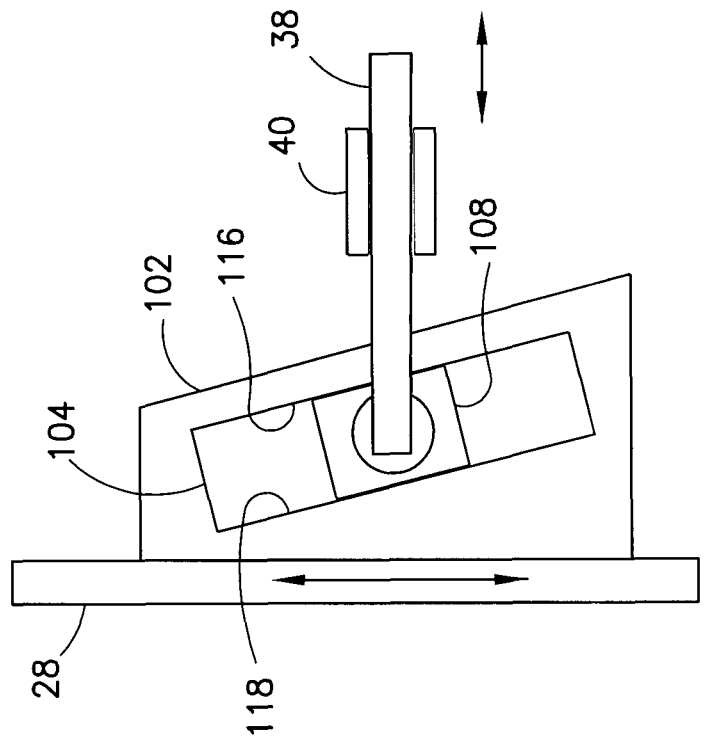

FIG. 15 is another concept diagram showing a side view of a cam configuration in accordance with a further alternative embodiment. This configuration differs from that shown in FIG. 15 in that the camming surfaces 116, 118 are low-friction surfaces, and the cam follower comprises a sliding block 108 is rotatably coupled to a forward end of push rod 38.

In accordance with the particular embodiment shown in FIGS. 3, 5, 8, 10 and 11, the as-manufactured shapes of the installed petals are designed to produce the fan nozzle over-area when the petals are in their undeflected states. The petal link assembly facilitates easy petal position adjustment. The cam ring segment and cooperating cam followers/push rods push the petals inward to reduce the fan nozzle throat area. All heavy actuation linkages are located at the bulkhead. The configurations disclosed herein make it possible to employ a single centrally located actuator.

The concept of using a push rod and a petal link pivotably coupled to the push rod to operatively couple a petal to a cam follower is not limited in its application to two-sided cams of the types shown in FIGS. 4, 14 and 15. Instead of using a two-sided cam that respectively extends and retracts the push rod, a one-sided cam (i.e., with a rearward-facing camming surface) can be used to extend the push rod while providing a spring or other biasing means (e.g., see spring 75 in FIG. 8 and springs 124a,b in FIG. 12) to return (i.e., retract) the push rod. In such alternative embodiments, the cam follower would have a single bearing (or a single set of bearing) that bears against a single camming surface.

While variable area fan nozzles have been described with reference to various embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

The invention claimed is:

1. A variable area fan nozzle comprising:
   a support member having a shape that is a circle or portion thereof, said support member being centered at an axis;
   a movable member having a shape corresponding to the shape of said support member, said movable member being supported by and movable along said support member, movement along said support member being a rotation of said movable member about said axis;
   a drive system capable of moving said movable member segment along said support member;
   a cam attached to or integrally formed with said movable member;
   a cam follower that is displaced along a straight line by said cam during rotational movement of said movable member along said support member;
   a push rod having a longitudinal axis and one end pivotably coupled to said cam follower for rotation about an axis perpendicular to said longitudinal axis;
   a petal link having one end pivotably coupled to an opposite end of said push rod; and
   a petal pivotably coupled to said support member and to an opposite end of said petal link.

2. The variable area fan nozzle as recited in claim 1, wherein when said movable member moves along said support member in one direction, said petal pivots inward, and when said movable member moves along said support member in an opposite direction, said petal pivots outward.

3. The variable area fan nozzle as recited in claim 1, wherein said cam comprises a slot, and said cam follower comprises a bearing rotatably mounted to said one end of said push rod, said bearing being disposed in said slot of said cam.

4. The variable area fan nozzle as recited in claim 1, wherein said cam comprises a slot, and said cam follower comprises a sliding block pivotably mounted to said one end of said push rod, said sliding block being disposed in said slot of said cam.

5. The variable area fan nozzle as recited in claim 1, wherein said cam comprises forward- and rearward-facing camming surfaces, and said cam follower comprises a first bearing in contact with said forward-facing camming surface and a second bearing in contact with said rearward-facing camming surface, said first and second bearings being rotatably mounted to said push rod.

6. The variable area fan nozzle as recited in claim 1, wherein said cam comprises forward- and rearward-facing camming surfaces, and said cam follower comprises a first sliding block in contact with said forward-facing camming surface and a second sliding block in contact with said rearward-facing camming surface, wherein said first and second sliding blocks are pivotably mounted to said push rod.

7. The variable area fan nozzle as recited in claim 1, wherein said petal link comprises a threaded body for adjusting the length of said pivot link.

8. The variable area fan nozzle as recited in claim 1, further comprising a push rod fitting attached to said support member, said push rod fitting comprising a guide having an axis, and said push rod comprising a portion which is disposed in said guide, wherein said guide restrains said push rod when said push rod moves along the guide axis.

9. A variable area fan nozzle comprising left and right fan nozzle assemblies, each of said left and right fan nozzle assemblies comprising:
   a support member having a shape that is a circle or portion thereof, said support member being centered at an axis;
   a movable member having a shape corresponding to the shape of said support member, said movable member being supported by and movable along said support member, movement along said support member being a rotation of said movable member about said axis;
   a drive system capable of moving said movable member segment along said support member;
   a plurality of cams attached to or integrally formed with said movable member, said cams being located at respective angular positions along said movable member;
   a plurality of cam followers that are displaced along respective straight lines by said cams during rotational movement of said movable member along said support member;
   a plurality of push rods, each push rod having a longitudinal axis and one end pivotably coupled to a respective one of said cam followers for rotation about an axis perpendicular to said longitudinal axis;
   a plurality of petals pivotably coupled to said support member; and
   a plurality of petal links, each petal link being pivotably coupled to a respective one of said push rods and to a respective one of said petals; and
   wherein said petals of said left and right fan nozzle assemblies define a throat area of said variable area fan nozzle.

10. The variable area fan nozzle as recited in claim 9, wherein when said movable members of said left and right fan nozzle assemblies rotate in respective first directions, said throat area decreases, and when said movable members of said left and right fan nozzle assemblies rotate in respective second directions opposite to said respective first directions, said throat area increases.

11. The variable area fan nozzle as recited in claim 9, wherein each of said petal links comprises a threaded body for adjusting the length of said pivot link.

12. The variable area fan nozzle as recited in claim 9, of said left and right fan nozzle assemblies further comprises a plurality of push rod fittings attached to said support member, each push rod fitting comprising a guide having an axis, and each push rod comprising a portion which is disposed in the guide of a respective one of said push rod fittings, wherein each guide restrains a respective push rod when that push rod moves along the guide axis.

13. A variable area fan nozzle comprising:
a support member having a shape that is a circle or portion thereof, said support member being centered at an axis;
a movable member having a shape corresponding to the shape of said support member, said movable member being supported by and movable along said support member, movement along said support member being a rotation of said movable member about said axis;
a drive system capable of moving said movable member segment along said support member;
a cam attached to or integrally formed with said movable member and comprising a forward-facing camming surface and a rearward-facing camming surface;
a cam follower that is displaced rearward along a straight line by said rearward-facing camming surface during rotational movement of said movable member about said axis in a first direction and is displaced forward along said straight line by said forward-facing camming surface during rotational movement of said movable member about said axis in a second direction opposite to said first direction;
a petal pivotably coupled to said support member; and
a petal linkage assembly that operatively couples said cam follower to said petal.

14. The variable area fan nozzle as recited in claim 13, wherein when said movable member moves along said support member in one direction, said petal pivots inward, and when said movable member moves along said support member in an opposite direction, said petal pivots outward.

15. The variable area fan nozzle as recited in claim 13, wherein said forward- and rearward-facing camming surfaces comprise opposing surfaces of a slot formed in said cam, and said cam follower comprises a bearing rotatably mounted to said one end of said push rod, said bearing being disposed in said slot of said cam.

16. The variable area fan nozzle as recited in claim 13, wherein said forward- and rearward-facing camming surfaces comprise opposing surfaces of a slot formed in said cam, and said cam follower comprises a sliding block pivotably mounted to said one end of said push rod, said sliding block being disposed in said slot of said cam.

17. The variable area fan nozzle as recited in claim 13, wherein said cam follower comprises a first bearing in contact with said forward-facing camming surface and a second bearing in contact with said rearward-facing camming surface, said first and second bearings being rotatably mounted to said push rod.

18. The variable area fan nozzle as recited in claim 13, wherein said cam follower comprises a first sliding block in contact with said forward-facing camming surface and a second sliding block in contact with said rearward-facing camming surface, wherein said first and second sliding blocks are pivotably mounted to said push rod.

19. An apparatus installed on an aircraft, comprising:
a sleeve or duct having a trailing lip area comprising a support member having a shape that is a circle or portion thereof, said support member being centered at an axis;
a movable member having a shape corresponding to the shape of said support member, said movable member being supported by and movable along said support member, movement along said support member being a rotation of said movable member about said axis;
a drive system capable of moving said movable member segment along said support member;
a plurality of cams attached to or integrally formed with said movable member, said cams being located at respective angular positions along said movable member, each of said cams comprising a forward-facing camming surface and a rearward-facing camming surface;
a plurality of cam followers that are displaced along respective straight lines by said cams during rotational movement of said movable member along said support member, wherein each of said cam followers is displaced rearward along a straight line by the rearward-facing camming surface of a respective cam during rotational movement of said movable member about said axis in a first direction, and each of said cam followers is further displaced forward along said straight line by the forward-facing camming surface of said respective cam during rotational movement of said movable member about said axis in a second direction opposite to said first direction;
a plurality of petals pivotably coupled to said support member; and
a plurality of petal linkage assemblies, wherein each petal linkage assembly operatively couples a respective one of said cam followers to a respective one of said petals.

20. The apparatus as recited in claim 19, wherein each of said petal linkage assemblies comprises:
a push rod coupled to a respective one of said cam followers; and
a petal link pivotably coupled to a respective one of said push rods and to a respective one of said petals.

* * * * *